(12) United States Patent
Wagner et al.

(10) Patent No.: US 12,042,978 B2
(45) Date of Patent: *Jul. 23, 2024

(54) PERMANENT TOOLING FOR COMPOSITE COIL SPRING COMPRESSION MOLDING

(71) Applicant: Ford Global Technologies, LLC, Dearborn, MI (US)

(72) Inventors: David Anthony Wagner, Dearborn, MI (US); Jeffrey Michael Hatt, Livonia, MI (US); Gerald J. Heath, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,833

(22) Filed: Dec. 14, 2022

(65) Prior Publication Data

US 2023/0109774 A1 Apr. 13, 2023

Related U.S. Application Data

(63) Continuation-in-part of application No. 17/713,558, filed on Apr. 5, 2022, now Pat. No. 11,780,148, (Continued)

(51) Int. Cl.
*B29C 45/44* (2006.01)
*B29C 45/00* (2006.01)
(Continued)

(52) U.S. Cl.
CPC .............. *B29C 53/60* (2013.01); *B29C 45/00* (2013.01); *B29C 45/2614* (2013.01);
(Continued)

(58) Field of Classification Search
CPC ............ B29C 43/02; B29C 2043/3615; B29C 2043/3618; B29C 45/00; B29C 45/03;
(Continued)

(56) References Cited

U.S. PATENT DOCUMENTS 5,240,223 A * 8/1993 Welch ..................... B29C 33/48
249/149
8,939,438 B2 * 1/2015 Kempf .................... B29C 45/44
267/148

(Continued)

*Primary Examiner* — Thu Khanh T. Nguyen
(74) *Attorney, Agent, or Firm* — Burris Law, PLLC

(57) ABSTRACT

An inner mandrel for forming a variable taper component includes a plurality of interlocking pieces and a brace. Each interlocking piece defines opposed tapered edge faces, a first surface, and a tapered second surface opposite the first surface. One of the edge faces defines a locking feature and another of the edge faces defines a receiving feature engaging the locking feature of an adjacent interlocking piece. The first surface defines a variable taper and a plurality of recesses. The brace secures the plurality of interlocking pieces to each other in a concentric arrangement about a central axis. A maximum width of each of the interlocking pieces is smaller than a minimum width of an end portion of the variable taper component. A central portion of the variable taper component is wider than the end portions.

20 Claims, 19 Drawing Sheets

Related U.S. Application Data which is a continuation of application No. 16/682,846, filed on Nov. 13, 2019, now Pat. No. 11,318,660.

(51) Int. Cl.
    *B29C 45/26*     (2006.01)
    *B29C 45/40*     (2006.01)
    *B29C 53/60*     (2006.01)
    *B29C 45/56*     (2006.01)
    *B29L 31/00*     (2006.01)

(52) U.S. Cl.
    CPC .......... B29C 45/40 (2013.01); *B29C 45/2602* (2013.01); *B29C 45/561* (2013.01); *B29L 2031/7742* (2013.01)

(58) Field of Classification Search
    CPC ..... B29C 45/04; B29C 45/0416; B29C 45/26; B29C 45/2602; B29C 45/40; B29C 53/06
    See application file for complete search history.

(56) References Cited

U.S. PATENT DOCUMENTS

| | | | |
|---|---|---|---|
| 9,022,777 B2 * | 5/2015 | Jang | .................... B29C 45/2614 425/DIG. 58 |
| 2021/0323245 A1 * | 10/2021 | Lochner | .................. B29C 33/54 |

* cited by examiner

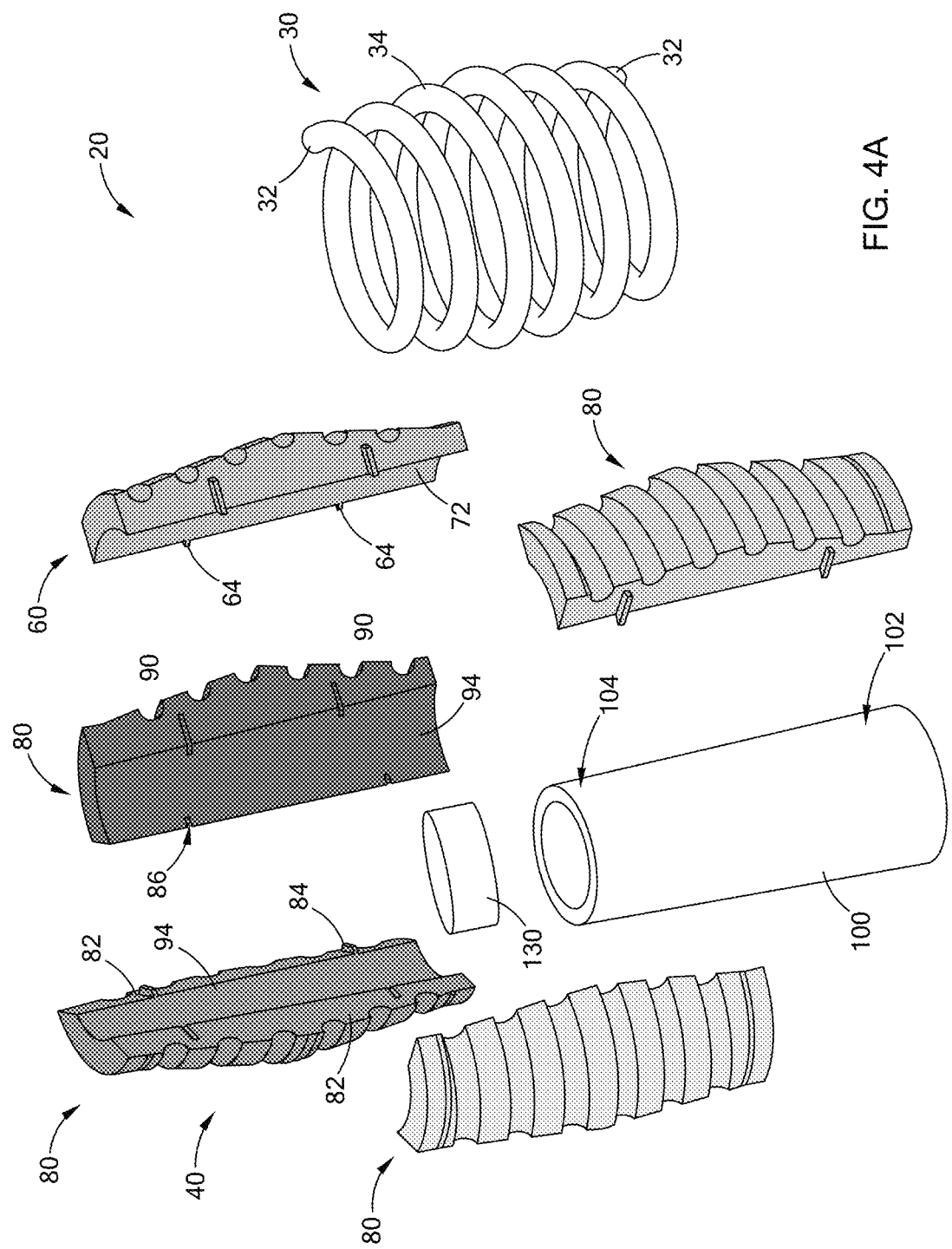



PERMANENT TOOLING FOR COMPOSITE COIL SPRING COMPRESSION MOLDING

CROSS-REFERENCE TO RELATED APPLICATIONS

This application is a continuation-in-part of and claims the benefit of U.S. application Ser. No. 17/713,558, filed Apr. 5, 2022, and titled "PERMANENT TOOLING FOR COMPOSITE COIL SPRING COMPRESSION MOLDING" (now U.S. Pat. No. 11,780,148), which is a continuation of and claims the benefit of U.S. application Ser. No. 16/682,846, filed Nov. 13, 2019, of the same title (now U.S. Pat. No. 11,318,660), the contents of which are incorporated herein by reference in their entireties.

FIELD

The present disclosure relates to tooling, and more specifically to tooling for forming variable taper components such as coil springs.

BACKGROUND

The statements in this section merely provide background information related to the present disclosure and may not constitute prior art.

Most commercially available tooling for variable taper components, such as composite coil springs, are destroyed after forming the variable taper component in order to remove the variable taper component from the trapped tooling. For example, and referring to FIG. 1, a variable taper composite coil spring 10 is shown, which includes a smaller diameter portion 12 at each end and a larger diameter portion 14 in the center. An inner mandrel (not shown) used to form this variable taper composite coil spring 10 is then "locked" inside after the variable taper composite coil spring 10 is formed/cured. Accordingly, the inner mandrel must be destroyed in order to remove the variable taper composite coil spring 10 from the inner mandrel. The inner mandrel is then remanufactured to produce each additional spring, which is costly and time consuming.

Other commercially available tooling uses a bismuth core mandrel that is melted out of the variable taper component after forming and then recast after each variable taper component is produced. This process greatly increases the part cost for each variable taper component.

The present disclosure addresses these issues with variable taper components, among other issues related to tooling for variable taper components, such as composite coil springs.

SUMMARY

This section provides a general summary of the disclosure and is not a comprehensive disclosure of its full scope or all of its features.

In one form, tooling for use in forming a variable taper component includes an inner mandrel, an outer mandrel disposed around the inner mandrel, the outer mandrel defining a corresponding plurality of recesses configured to receive at least a portion of the variable taper component, and a brace. The inner mandrel includes a plurality of interlocking pieces, each interlocking piece defining opposed tapered edge faces, one of the opposed tapered edge faces defining at least one locking feature and another of the opposed tapered edge faces defining at least one receiving feature to engage the at least one locking feature of an adjacent interlocking piece, a first surface defining a variable taper and a plurality of recesses configured to receive at least a portion of the variable taper component, and a tapered second surface opposite the first surface. The brace secures the plurality of interlocking pieces to each other in a concentric arrangement about a central axis. A maximum width of each of the interlocking pieces is smaller than a minimum width of end portions of the variable taper component, and a central portion of the variable taper component is wider than the end portions.

In variations of the tooling, which may be implemented individually or in combination: the locking feature is a linear tab and the receiving feature is a linear slot; the locking feature is a T-shaped tab and the receiving feature is a T-shaped slot.; the locking feature and the receiving feature are magnetic; the variable taper is continuously variable along end portions of the tooling and is constant along a central portion of the tooling; the plurality of interlocking pieces and the outer mandrel define a variable taper helix; the brace is one of an inflatable bladder and a plate; the plate includes a plurality of extensions secured to respective slots defined in respective outer portions of the interlocking pieces; each interlocking piece includes a respective protrusion and the plate defines a respective slot configured to receive at least one of the protrusions; each protrusion has a different size or shape than each other protrusion, and each slot is configured to receive exactly one of the protrusions; the inflatable bladder has an outer surface engaging respective inner surfaces of the interlocking pieces; the brace is an insert engaging respective inner surfaces of the interlocking pieces, the insert defining respective key holes on opposing ends, the key holes configured to receive respective end plug keys of a rotator.

An inner mandrel for forming a variable taper component includes a plurality of interlocking pieces, and a brace. Each interlocking piece defines opposed tapered edge faces, one of the opposed tapered edge faces defining at least one locking feature and another of the opposed tapered edge faces defining at least one receiving feature to engage the at least one locking feature of an adjacent interlocking piece, a first surface defining a variable taper and a plurality of recesses configured to receive at least a portion of the variable taper component, and a tapered second surface opposite the first surface. The brace secures the plurality of interlocking pieces to each other in a concentric arrangement about a central axis. A maximum width of each of the interlocking pieces is smaller than a minimum width of an end portion of the variable taper component, and a central portion of the variable taper component is wider than the end portions.

In variations of the inner mandrel, which may be implemented individually or in combination: the brace is an inflatable bladder having an outer surface engaging respective inner surfaces of the interlocking pieces; the brace is a plate configured to secure the interlocking pieces to each other; the plate includes a plurality of extensions secured to respective slots defined in respective outer portions of the interlocking pieces; each interlocking piece includes a respective protrusion and the plate defines a respective slot configured to receive one of the protrusions of the interlocking pieces; the brace is an insert engaging respective inner surfaces of the interlocking pieces, the insert defining respective key holes on opposing ends, the key holes configured to receive respective end plug keys of a rotator.

A method of forming a variable taper component includes placing a variable taper component preform around an inner mandrel and forming a variable taper component from the variable taper component preform. A composite coil spring is formed according to the method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is an exploded view of FIG. 3;

Figure 1:
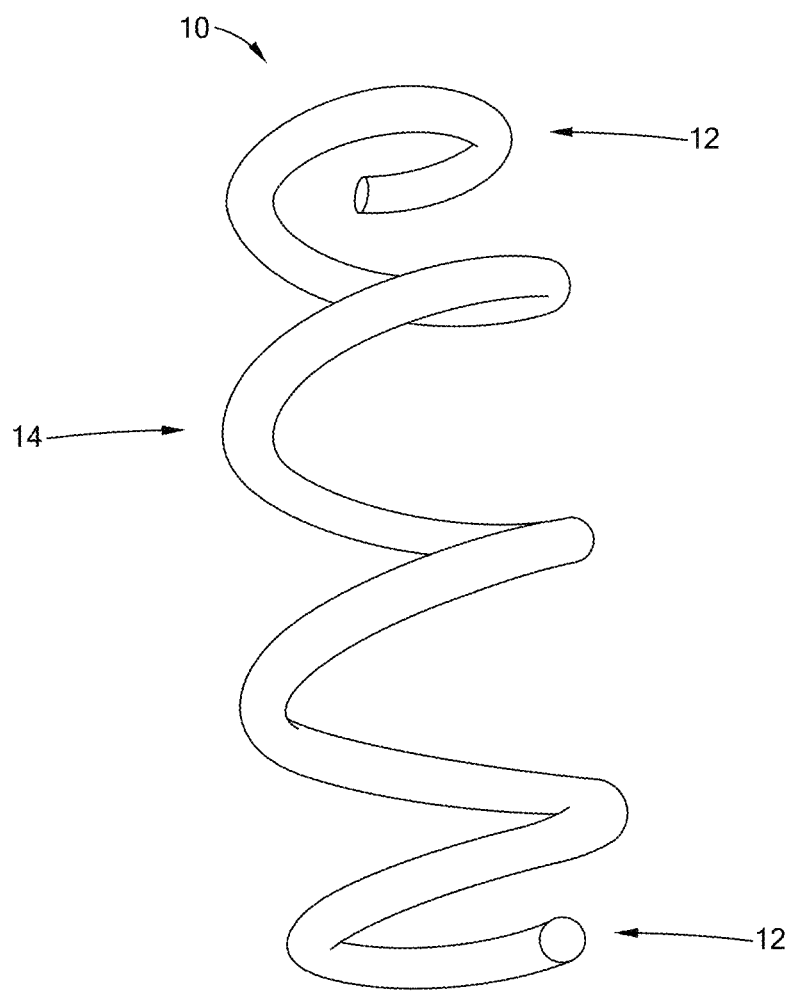
FIG. 1 is a perspective view of a variable taper composite coil spring according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
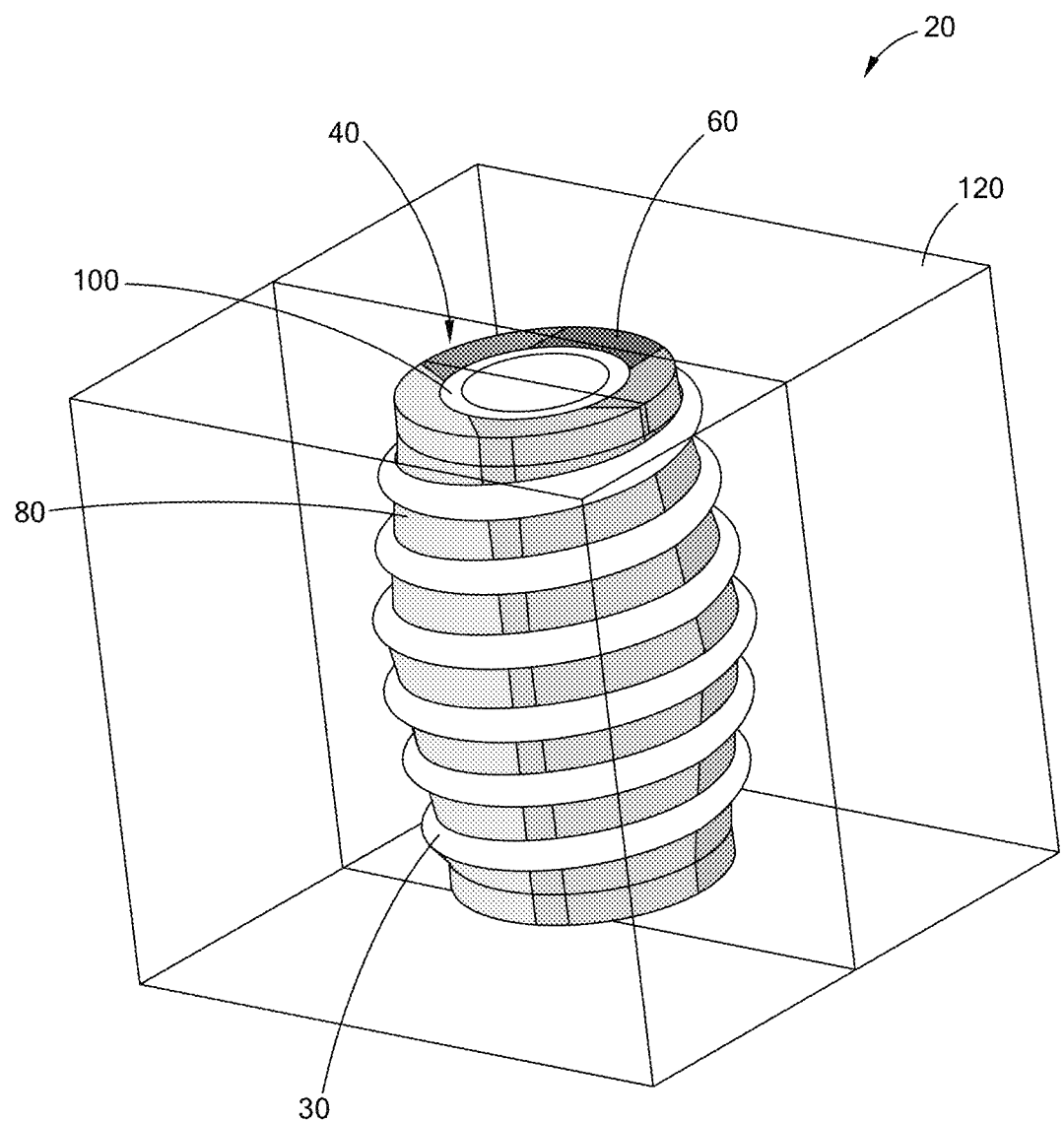
FIG. 2 is a perspective view of tooling for forming a variable taper component constructed according to the teachings of the present disclosure.
Figure 3:
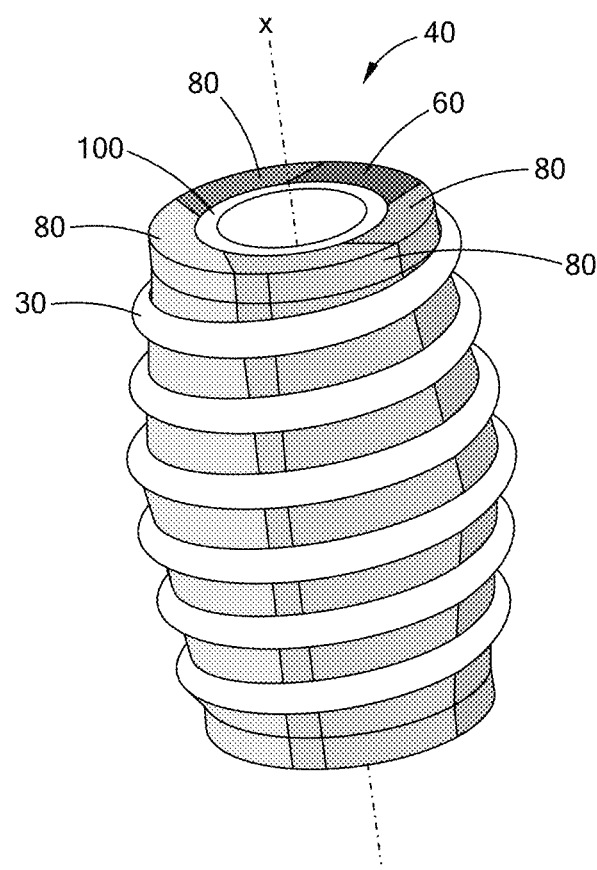
FIG. 3 is a perspective view of an inner mandrel and a variable taper component constructed according to the teachings of the present disclosure.

Referring to FIGS. 2 through 4, tooling 20 for use in forming a variable taper component 30 is shown. The tooling 20 generally comprises an inner mandrel 40 comprised of several pieces, which are described in greater detail below, and in some forms includes an outer mandrel 120.

The inner mandrel 40 comprises a master insert 60, a plurality of interlocking pieces 80, and a tapered inner sleeve 100. As shown, the plurality of interlocking pieces 80 are arranged concentrically with the master insert 60, and each of the components of the inner mandrel 40 are designed to be assembled and disassembled in a specific order so that they may be reused for each subsequent forming operation to produce the variable taper component 30, which is described in greater detail below.

Referring first to FIGS. 5A-5G, the master insert 60 is illustrated in greater detail. The master insert 60 defines opposed tapered edge faces 62, an external surface 66, and a tapered internal surface 72. Each opposed tapered edge face 62 defines at least one locking feature 64, which is configured to engage a corresponding receiving feature in the adjacent interlocking pieces, which is illustrated and described in greater detail below. Although a total of four (4) locking features 64 are shown, two (2) on each opposed tapered edge face 62, it should be understood that any number of locking features may be employed, and in a number of locations besides those illustrated, while remaining within the scope of the present disclosure.

The external surface 66 includes a variable taper 68 (represented by an offset phantom profile in FIG. 5E) as shown and a plurality of recesses 70 configured to receive at least a portion of the variable taper component 30. The variable taper 68 is relative to a longitudinal axis X of the inner mandrel 40 and should be construed to mean that the geometry, or profile, of the external surface 66 increases and decreases along the longitudinal axis X. Further, it should be understood that the variable taper need not be symmetrical about a central portion of the inner mandrel 40 as shown herein and may further be continuously variable or have zones having the same taper transitioning to zones having a different taper while remaining within the scope of the present disclosure. In one form, the taper is continuously variable from the center portion to the end portions while remaining constant along a central portion of the tooling 20.

Generally, the variable taper 68 of the external surface 66 corresponds to the geometry of the variable taper component 30 being formed from the tooling 20, which has smaller end portions and a larger center portion as previously described.

Referring now to FIG. 4A and FIGS. 6A-6F, one of the interlocking pieces 80 is shown in greater detail. Each interlocking piece 80 defines opposed tapered edge faces 82, an external surface 88, and a tapered internal surface 94. One of the opposed tapered edge faces 82 of each interlocking piece 80 defines at least one locking feature 84, and another of the opposed tapered edge faces 82 defines at least one receiving feature 86 to engage the at least one locking feature 84 of an adjacent interlocking piece 80. Similar to the master insert 60 as described above, although a total of two (2) locking features 84 are shown with two (2) corresponding receiving features 86 on each interlocking piece 80, it should be understood that any number of locking features and receiving features may be employed, and in a number of locations besides those illustrated, while remaining within the scope of the present disclosure.

The external surface 88 defines a variable taper 90 (represented by an offset phantom profile in FIG. 6B) and a plurality of recesses 92 configured to receive at least a portion of the variable taper component 30. Notably, due to the plurality of recesses 92 configured to receive the variable taper component 30 and the tapered internal surface 94, each interlocking piece 80 of inner mandrel 40 is unique.

Generally, each of the opposed tapered edge faces 62 of master insert 60 and the opposed tapered edge faces 82 of the interlocking pieces 80 are normal to an external surface of a central portion 34 of the variable taper component 30 for ease of removal, which is illustrated and described in greater detail below. Further, a maximum width of each of the interlocking pieces 80 and the master insert 60 is smaller than a minimum width of end portions 32 of the variable taper component 30, also for ease of removal. Additionally, at least one locking feature 64 of the master insert 60 and at least one locking feature 84 of the plurality of interlocking features 80 define a pitch that is equal to a pitch of the variable taper component. In other words, the locking features 64/84 are at angle relative to each other across the master insert 60 and the interlocking pieces 80 that matches the angle of the variable taper component, in one form of the present disclosure.

Now referring back to FIG. 4A, the tapered inner sleeve 100 in one form is hollow and generally defines a portion of a geometrical cone. However, it should be understood that the tapered inner sleeve 100 could be hollow or solid and could further include a removal feature as described in greater detail below. The external surface of the tapered inner sleeve 100 is generally configured to mate with the tapered internal surfaces 72 and 94 of the master insert 60 and interlocking pieces 80, respectively. Further, the tapered inner sleeve has a wider proximal end portion 102 and a narrower distal end portion 104, thus forming the taper.

Figure 4B:
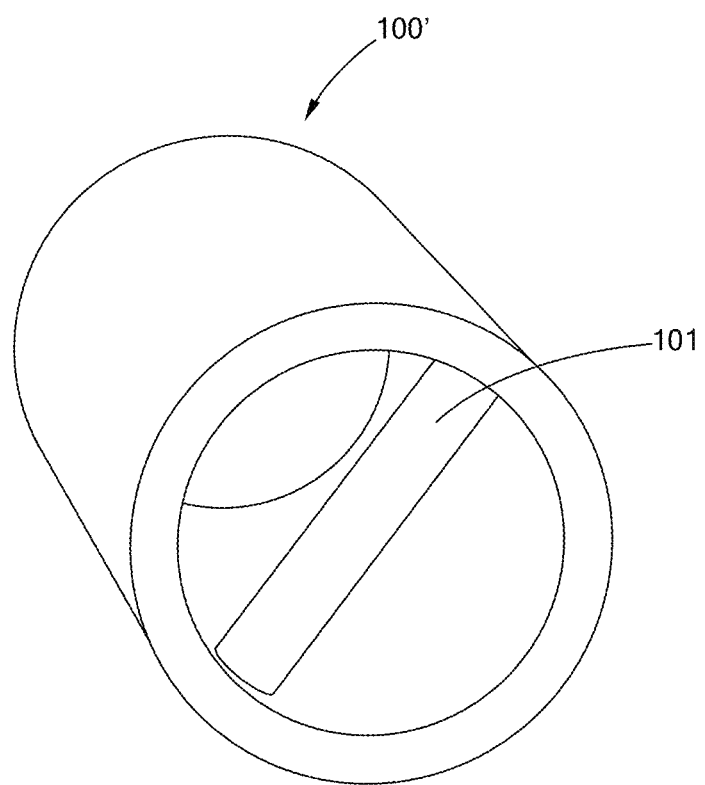
FIG. 4B is a perspective view of an alternate form of the tapered inner sleeve constructed in accordance with the teachings of the present disclosure.

Referring to FIG. 4B, in an alternate form, the tapered inner sleeve 100' includes a removal feature 101, which is configured to assist in removing or inserting the tapered inner sleeve 100 within the assembled master insert 60 and plurality of interlocking pieces 80. In this form, the removal feature 101 is a handle that extends across and interior portion of the tapered inner sleeve 100, which can be grasped by an operator or a machine/robot. It should be understood that this particular handle configuration is merely exemplary, and a wide variety of removal features may be employed while remaining within the scope of the present disclosure.

Figure 4C:
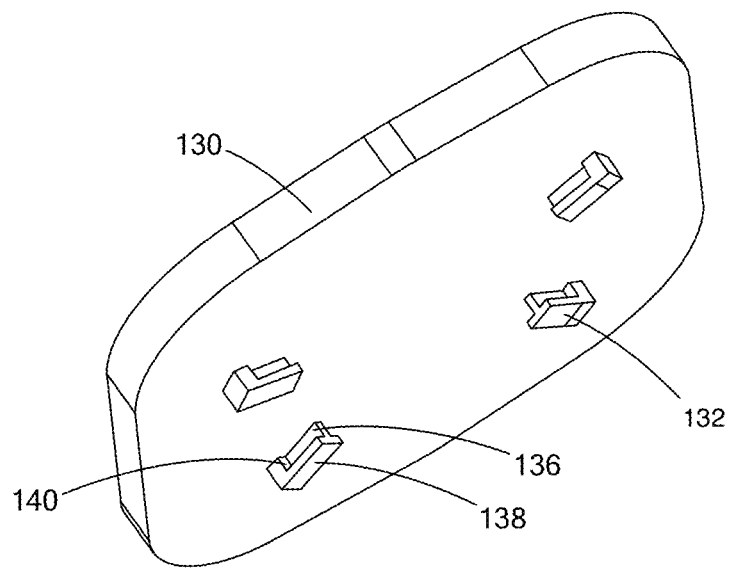
FIG. 4C is a perspective view of the underside of an alternate top member constructed in accordance with the teachings of the present disclosure.
Figure 4D:
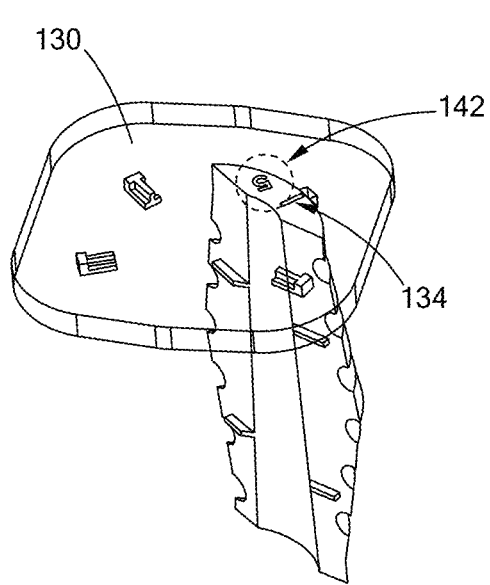
FIG. 4D is a perspective view of the top member of FIG. 4C engaging an interlocking piece and constructed in accordance with the teachings of the present disclosure.
Figure 4E:
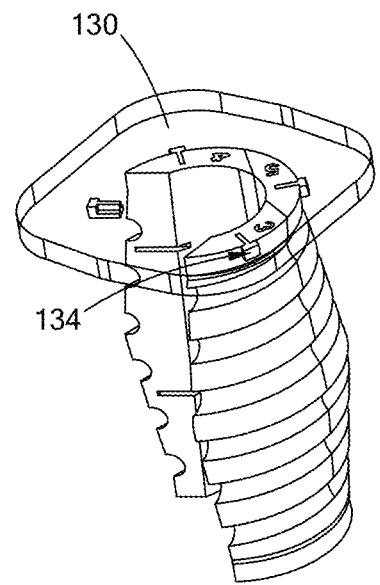
FIG. 4E is a perspective view of the top member of FIG. 4C engaging three (3) interlocking pieces and constructed in accordance with the teachings of the present disclosure.
Figure 5A:
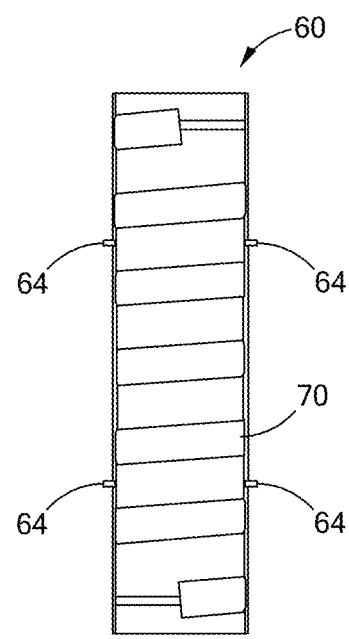
FIG. 5A is a side view illustrating an external portion of a master insert of tooling constructed in accordance with the teachings of the present disclosure.
Figure 5B:
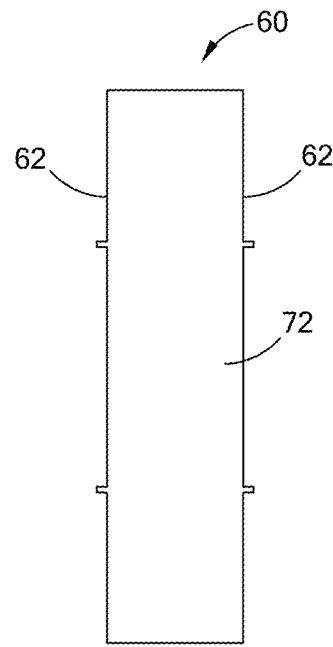
FIG. 5B is a side view illustrating an internal portion of the master insert of FIG. 5A.
Figure 5C:
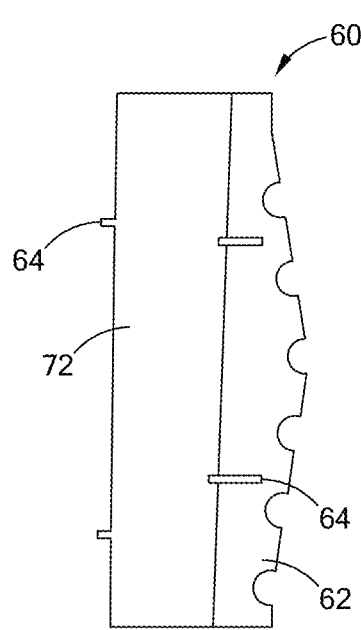
FIG. 5C is a rotated side view of the master insert of FIG. 5A.
Figure 5D:
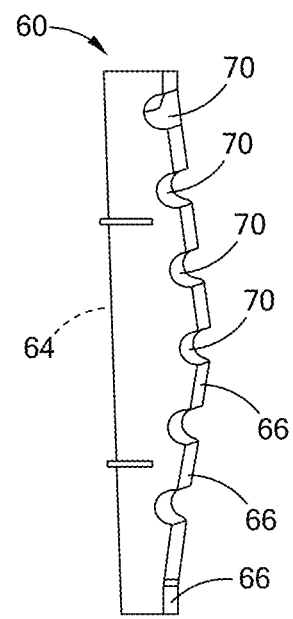
FIG. 5D is another rotated side view of the master insert of FIG. 5A.
Figure 5E:
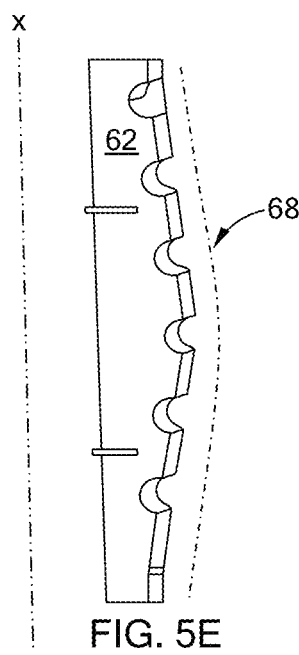
FIG. 5E is the same view as FIG. 5D, illustrating a variable taper of an external surface of the master insert of FIG. 5A.
Figure 5F:
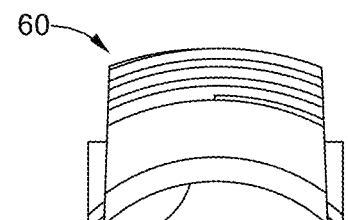
FIG. 5F is a top view of the master insert of FIG. 5A.
Figure 5G:
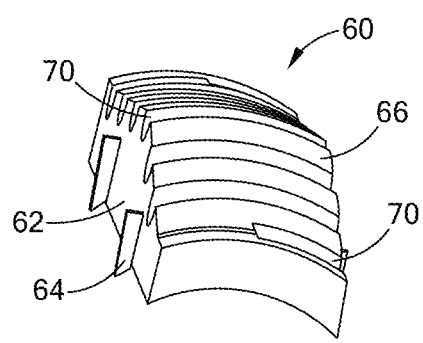
FIG. 5G is a perspective top view of the master insert of FIG. 5A.
Figure 6A:
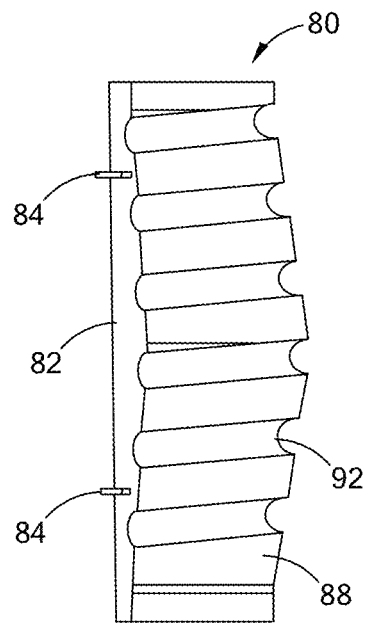
FIG. 6A is a rotated side view of an interlocking piece constructed in accordance with the teachings of the present disclosure.
Figure 6B:
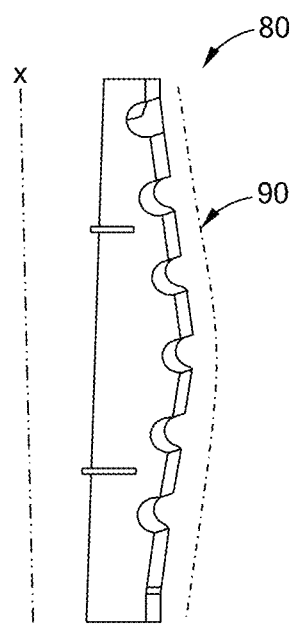
FIG. 6B is another rotated side view of the interlocking piece of FIG. 6A.
Figure 6C:
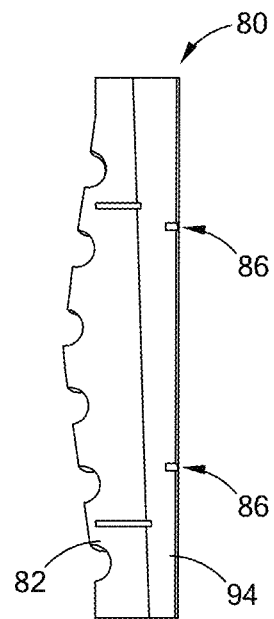
FIG. 6C is another rotated side view of the interlocking piece of FIG. 6A.
Figure 6D:
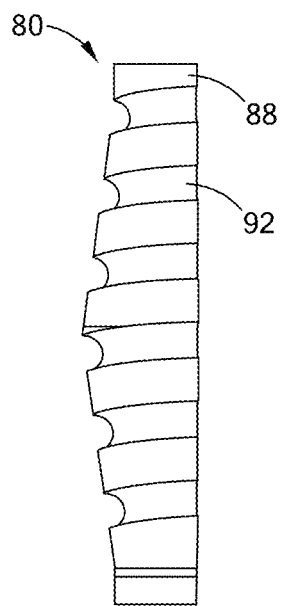
FIG. 6D is a side view of the interlocking piece of FIG. 6A.
Figure 6E:
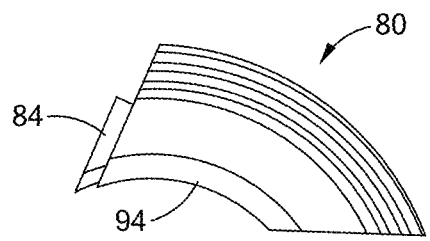
FIG. 6E is a top view of the interlocking piece of FIG. 6A.
Figure 6F:
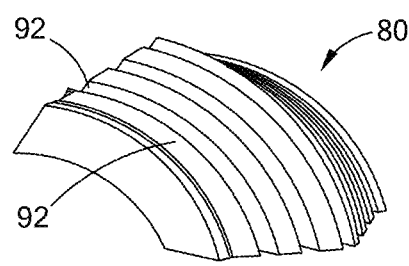
FIG. 6F is a top perspective view of the interlocking piece of FIG. 6A.

Referring now to FIGS. 4C-4E, in another alternate form, a top member 130 is disposed above the master insert 60 (not shown) and the plurality of interlocking pieces 80, the top member 130 defining a locking feature 132 and at least one of the plurality of interlocking pieces 80 further defining a receiving feature 134 disposed at an upper portion that engages the locking feature 132 of the top member 130. For clarity, only one interlocking piece 80 is shown in FIG. 4D and only three interlocking pieces are shown in FIG. 4E. The locking feature 132 in this form defines a center rail 136 on a platform 138, and a rear wall 140. With this configuration of a locking feature 132, the center rail 136 provides circumferential positioning, the platform 138 provides axial positioning, and the rear wall 140 provides radial positioning for the respective interlocking piece 80. With this alternate top member 130, the individual pieces/components of the inner mandrel 40 can be more securely locked together.

It should be understood that the specific locking feature 132 illustrated and described herein is merely exemplary, and thus other locking features may be employed while remaining within the scope of the present disclosure. Also, it should be understood that the locking features and receiving features illustrated and described throughout may be interchanged and placed on either of the adjacent components being locked together.

As further shown in FIGS. 4D and 4E, an alternate marking indicia 142 may be provided on components of the inner mandrel 40. For example, a numbering system can be used on each of the master insert 60 and the interlocking pieces 80 (shown with the numerals "3" and "4" and "5") to assist an operator or machine vision system as to which pieces should be assembled and disassembled in which particular order.

Generally, to assemble the inner mandrel 40, each of the interlocking pieces 80 are engaged with each other first, and the master insert 60 is then slid into place via the locking features 84 and receiving features 86. The tapered inner sleeve 100 is then slid into the center of the inner mandrel 40, and by virtue of its taper, forces each of the interlocking pieces 80 and the inner mandrel 40 together in an interlocking fashion.

Figure 7C:
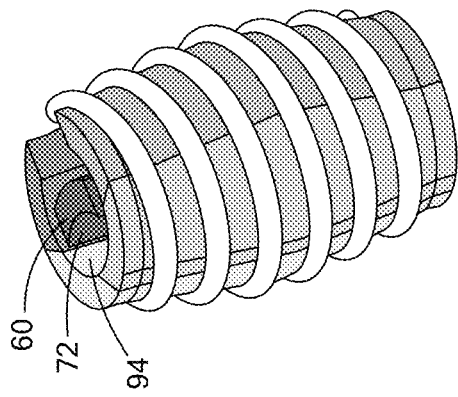
FIGS. 7A through 7L illustrate a sequence of disassembling and removing an inner mandrel from a variable taper component according to the teachings of the present disclosure.
Figure 7F:
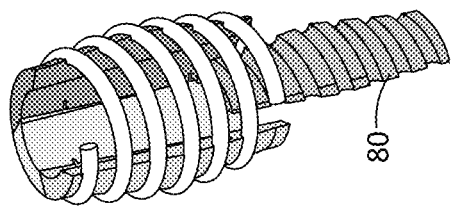
Figure 7B:
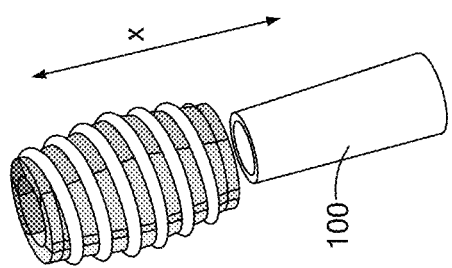
Figure 7E:
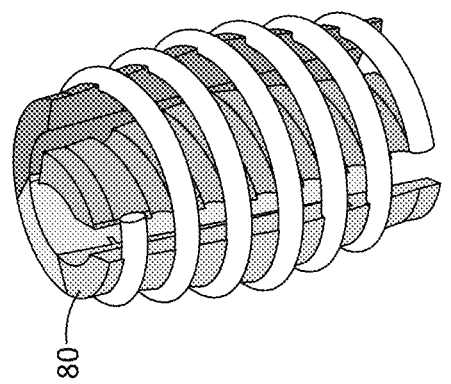
Figure 7A:
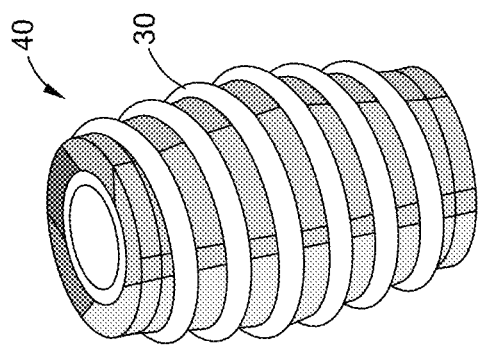
Figure 7D:
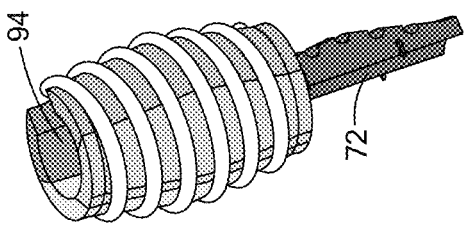
Figure 7I:
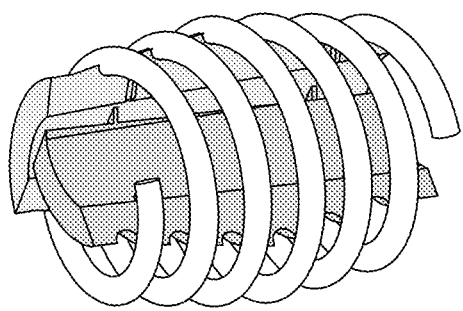
Figure 7L:
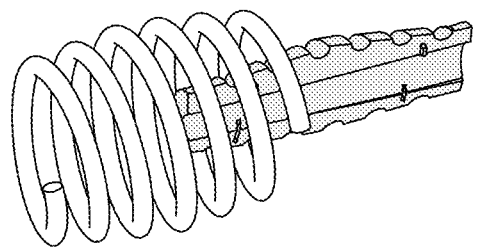
Figure 7H:
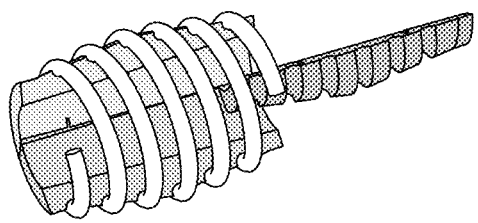
Figure 7K:
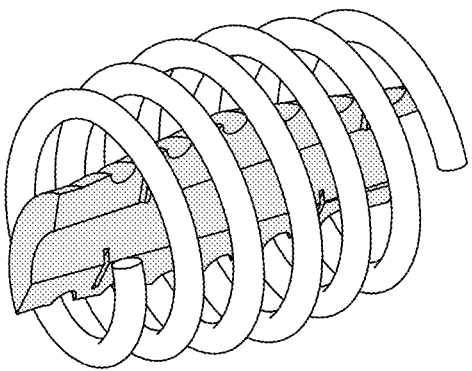
Figure 7G:
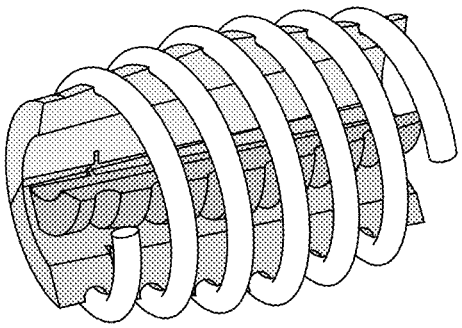
Figure 7J:
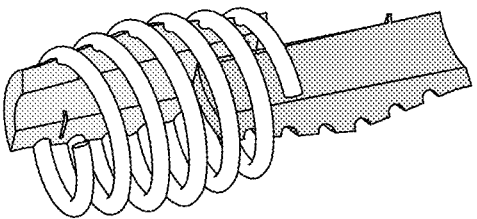

Referring now to FIGS. 4 and 7A through 7L, the inner mandrel 40 is configured to be disassembled and reused after forming a variable taper component 30. In FIG. 7A, the variable taper component 30 has been formed around the inner mandrel 40. After the variable taper component 30 is formed, as shown in FIG. 7B, the tapered inner sleeve 100 is translated (along the longitudinal axis X) or pulled out of the center of the inner mandrel 40. Since the tapered inner sleeve 100 presses against tapered internal surfaces 72 and 94, the removal of tapered inner sleeve 100 allows the master insert 60 to move. Accordingly, in FIG. 7C, the master insert 60 is moved inwardly, away from the variable taper component 30 and towards the center of the inner mandrel 40, and the locking features 64 slidably decouple from receiving features 86 of the adjacent interlocking pieces. As shown in FIG. 7D, master insert 60 can then be removed, or pulled out from the center of the inner mandrel 40.

Because the master insert 60 couples to opposed tapered edge faces 82 and receiving features 86 of adjacent interlocking pieces 80, the removal of the master insert 60 then allows at least one interlocking piece 80 to move. As shown in FIG. 7E, locking features 84 of one interlocking piece can be slidably decoupled from receiving features 86 of an adjacent interlocking piece 80, and the interlocking piece 80 can then be moved inwardly, away from the variable taper component 30 and towards the center of the inner mandrel 40, for its removal as shown in FIG. 7F.

This procedure for removing an interlocking piece 80 is then repeated as shown in FIGS. 7G through 7L, so that the remaining interlocking pieces 80 can be removed, thus freeing the variable taper component 30 from the inner mandrel 40. Advantageously, the inner mandrel 40 can be removed and reused in forming another variable taper component 30 without being destroyed.

Figure 8:
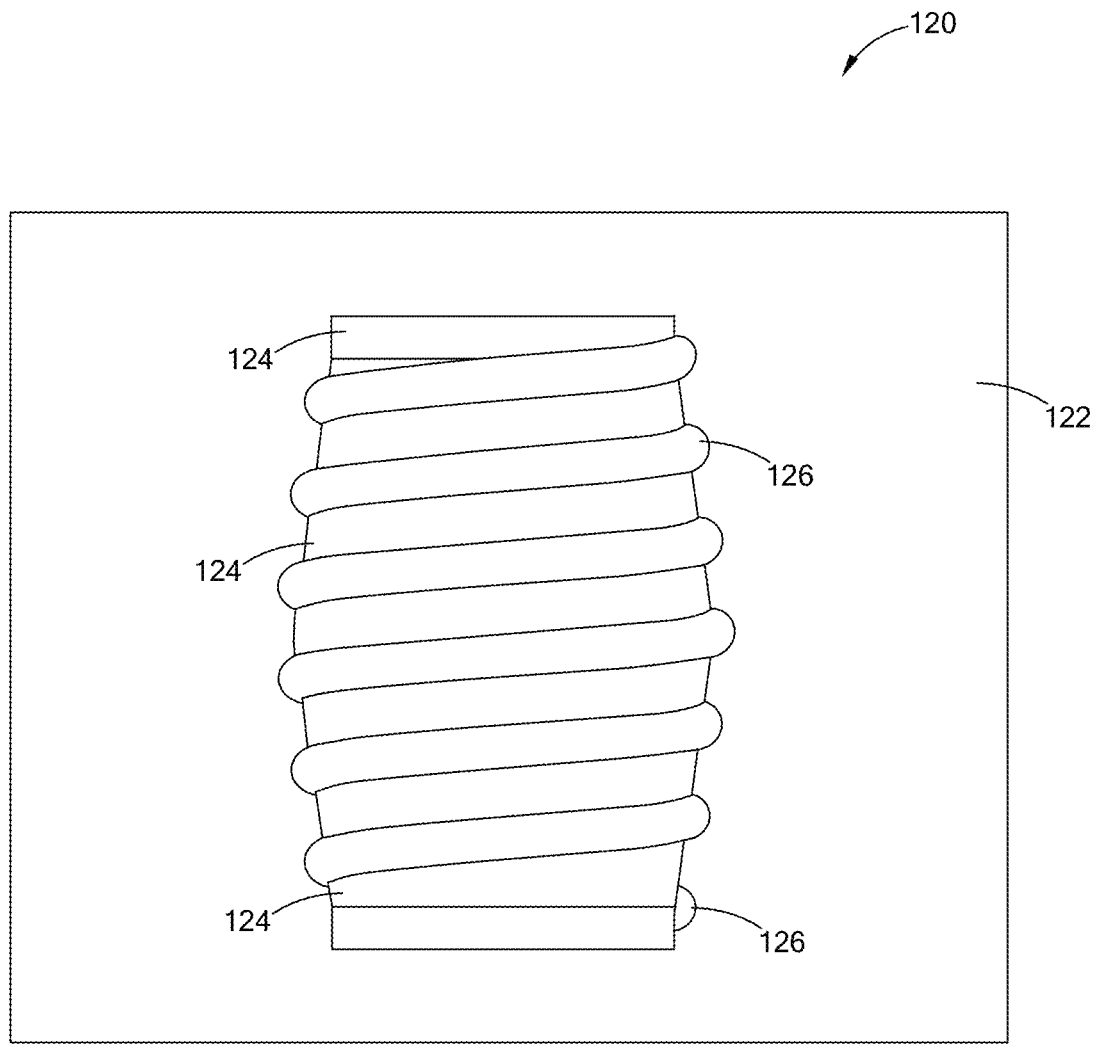
FIG. 8 is a perspective view of a portion of an outer mandrel constructed according to the teachings of the present disclosure.

Referring to FIG. 8, a side view of one half of the outer mandrel 120 from is shown. The outer mandrel 120 comprises a face 122 and an internal surface 124. The internal surface 124 defines a corresponding plurality of recesses 126 configured to receive at least a portion of variable taper component 30. Generally, the internal surface 124 is configured to couple, or conform to the variable taper component 30 and the external geometries of the master insert 60 and interlocking pieces 80. Accordingly, the tooling 20 can be used in a variety of manufacturing operations such as, by way of example, compression molding or injection molding. Although a two-piece outer mandrel 120 is shown herein, it should be understood that any number of pieces, or alternatively a conformal bladder or other tooling design, may be employed for the outer mandrel while remaining within the scope of the present disclosure.

In a compression molding application, the inner mandrel 40 is first assembled, and then a variable taper component preform (not shown) is placed within the recesses 70 and 92 of the master insert 60 and the interlocking pieces 80, respectively. The outer mandrel 120 is then placed around the variable taper component preform and the inner mandrel 40, and this assembly is placed in a compression molding die/tool. After forming, the outer mandrel 120 is removed first, and then the inner mandrel 40 is disassembled as described above. The variable taper component 30 can then be removed for further processing without destroying any tooling.

Similarly, for injection molding, the inner mandrel 40 and the outer mandrel 120 are assembled together (and positioned relative to each other with tooling features not shown), and then this assembly is placed into an injection molding tool. Molten resin, or molten resin with embedded fibers, can then be injected into the recesses 70 and 92 of the master insert 60 and the interlocking pieces 80, respectively, and the recesses 126 of the outer mandrel 120, to form the variable taper component 30. The outer mandrel 120 and inner mandrel 40 are removed as set forth above.

It should be understood that compression molding and injection molding are merely two examples of forming a variable taper component, and other processes are to be considered within the scope of the present disclosure. Further, a variety of part types may be formed using the innovative tooling 20 according to the teachings of the present disclosure. For example, a composite coil spring can be formed according to the teachings herein. The composite coil spring may comprise continuous or discontinuous fibers, which may be glass or carbon by way of example, in a curable resin matrix. The curable resin matrix can be either thermoset or thermoplastic.

Further, as illustrated herein, the plurality of recesses 70/92/126 in the master insert 60, the plurality of interlocking pieces 80, and the outer mandrel 120, respectively, define a variable taper helix in one form of the present disclosure.

The master insert 60, interlocking pieces 80, tapered inner sleeve 100, outer mandrel 120 and components thereof (e.g. locking feature, receiving feature, among others) can be made of any material that can withstand the processing temperatures and pressures when forming the variable taper component 30. As such, a tool steel is contemplated in one form, although other materials such as ceramics (e.g. alumina, carbides graphite, magnetic, nitrides, non-oxide, oxide, sand, silica, zirconia, among others), composites, other metals (e.g. aluminum-based, iron-based, magnetic, nickel-based, titanium-based, among others), polymers and combinations of these materials may comprise the master insert, interlocking pieces, tapered inner sleeve, and outer mandrel. Moreover, different materials can be used for each of the master insert 60, interlocking pieces 80, tapered inner sleeve 100, and outer mandrel 120 while remaining within the scope of the present disclosure.

Figure 9:
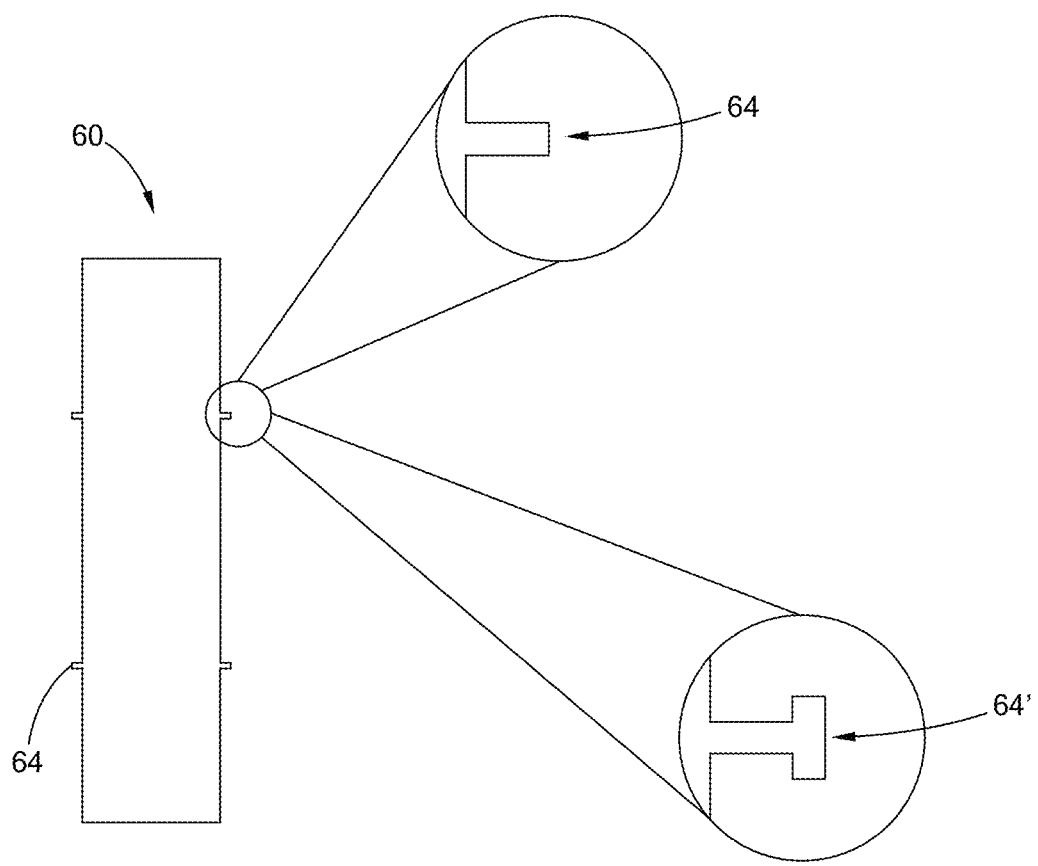
FIG. 9 illustrates alternative locking features of the master insert and/or interlocking pieces constructed according to the teachings of the present disclosure.

Referring now to FIG. 9, alternative forms of locking features 64 of a master insert 60 are shown. It should be understood that these locking features 64, and combinations thereof, may also be used with the locking features 84 of the interlocking pieces 80 while remaining within the scope of the present disclosure. In the first form, the locking feature 64 is a linear tab, while the receiving feature 86 (shown in FIG. 4A) is a linear slot. In an alternate form, the locking feature 64' is a T-shaped tab, while the receiving feature (not shown) is a T-shaped slot. In yet another form, the locking features may be magnetic, whether physical interlocking or exclusively magnetically interlocking. It should be understood that these exemplary variations, among others, may be employed to interlock the components of the inner mandrel 40 while remaining within the scope of the present disclosure.

Figure 10:
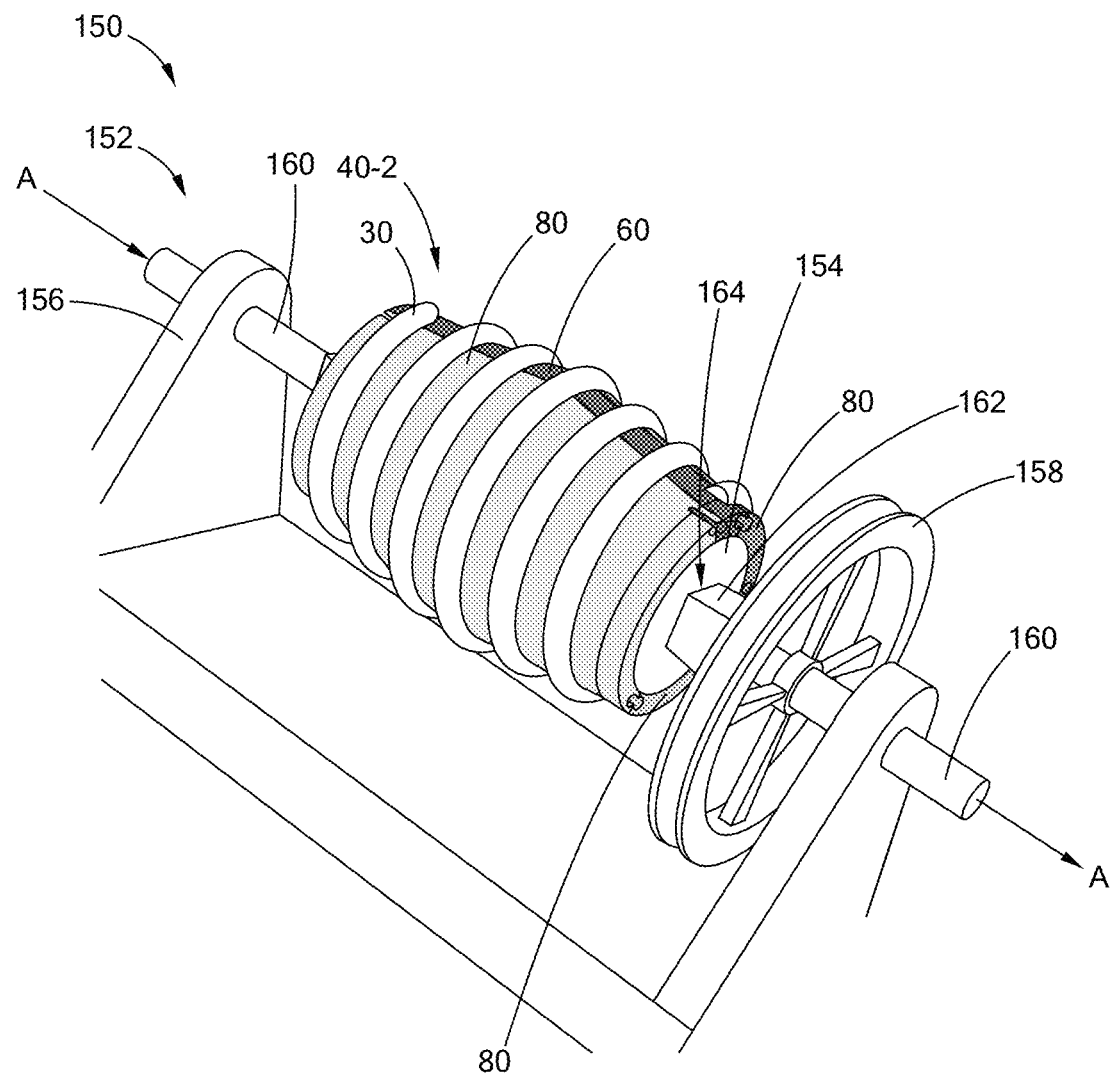
FIG. 10 is a perspective view of another inner mandrel and variable taper component constructed according to the teachings of the present disclosure.
Figure 11:
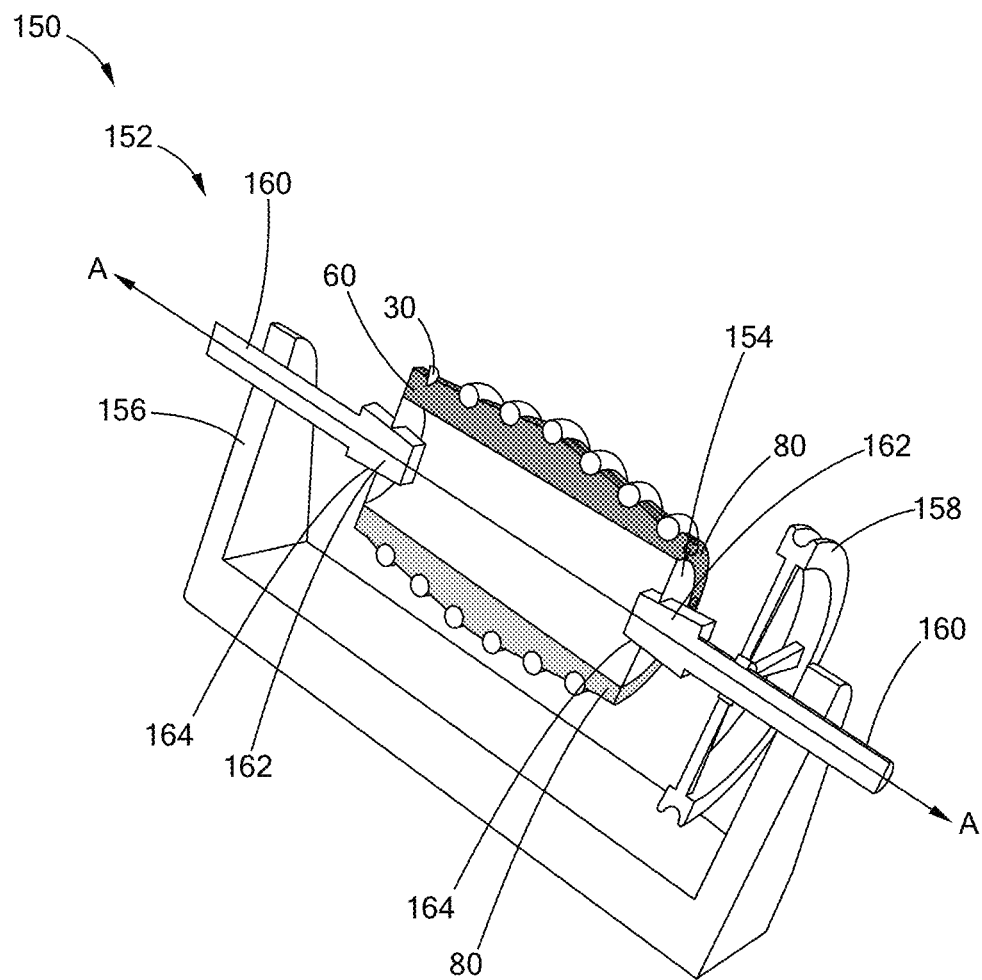
FIG. 11 is a cross-sectional view of the inner mandrel and variable taper component of FIG. 10.

With reference to FIGS. 10-11, another alternative form of tooling 150 for forming the variable taper component 30 is shown. In this form, the tooling 150 includes a rotator 152, and an inner mandrel 40-2. The rotator 150 supports the inner mandrel 40-2 for rotation about an axis A. The inner mandrel 40-2 can be similar to the inner mandrel 40 described above, except as otherwise shown or described herein. Accordingly, similar reference numerals refer to similar features and only differences will be described in detail herein. The inner mandrel 40-2 includes the master insert 60, the interlocking pieces 80, and a brace. In this context, a "brace" is a device or mechanism that physically braces or holds the plurality of interlocking pieces 80 and the master insert 60 together, inhibiting the interlocking pieces 80 and the master insert 60 from moving relative to each other. In one form, the brace is an inner sleeve 154. The inner sleeve 154, like the tapered inner sleeve 100 described above, inhibits movement of the interlocking pieces 80 and the master insert 60, thereby bracing them to each other about the axis A.

The rotator 152 includes a base 156, a torque imparting device 158, and opposing rods 160, each rod 160 including an end plug key 162 that extends into keyholes 164 defined in the inner sleeve 154. The rods 160 are rotatably supported by the base 156 such that the rods 160 rotate freely about the axis A relative to the base 156, such as with a bearing or the like. The keyholes 164 of the inner sleeve 154 are sized to receive the end plug keys 162. The keyholes 164 of FIGS. 10-11 are substantially rectangular to receive trapezoidally-shaped end plug keys 162, and it is within the scope of the disclosure to have different shaped keyholes 164 to receive mating end plug keys 162. As such, rotation of the rods 160 rotates the inner mandrel 40-2 about the axis A.

The torque imparting device 158 is coupled to at least one of the rods 160 and configured to rotate the rod 60 about the axis A. In the example provided, the torque imparting device 158 is a wheel coupled to one of the rods 60. As such, the torque imparting device 158 is also referred to herein as the wheel 158. In the example provided, the wheel 158 is rotationally driven by a belt (not shown), or the like, that is in contact with an outer surface of the wheel 158, the belt being rotated by a prime mover (e.g., an electric motor). In an alternative form, not shown, the wheel 158 can be a gear in meshing engagement with another gear or a reduction gearset that is driven by the prime mover. In yet another form, an electric motor may be directly coupled to the rod 60.

The variable taper component 30 may be formed by rotating the inner mandrel 40-2 and applying material (such as the variable taper component preform, as described above) thereupon. In the example provided, the wheel 158 rotates the rods 160 and the end plug keys 162, and the end plug keys 162 rotate the inner sleeve 154 to extend the preform along the recesses of the inner mandrel 40-2 (such as the recesses 70 in the master insert 60 and interlocking pieces 80 described above). The preform is then cured into the variable taper component 30 and the end plug keys 162 are removed from the inner sleeve 154, freeing the inner mandrel 40-2 and the variable taper component 30 from the rotator 152. The inner mandrel 40-2 is then removed from the variable taper component 30, similar to as shown in FIGS. 7A-7L and described above.

Figure 12:
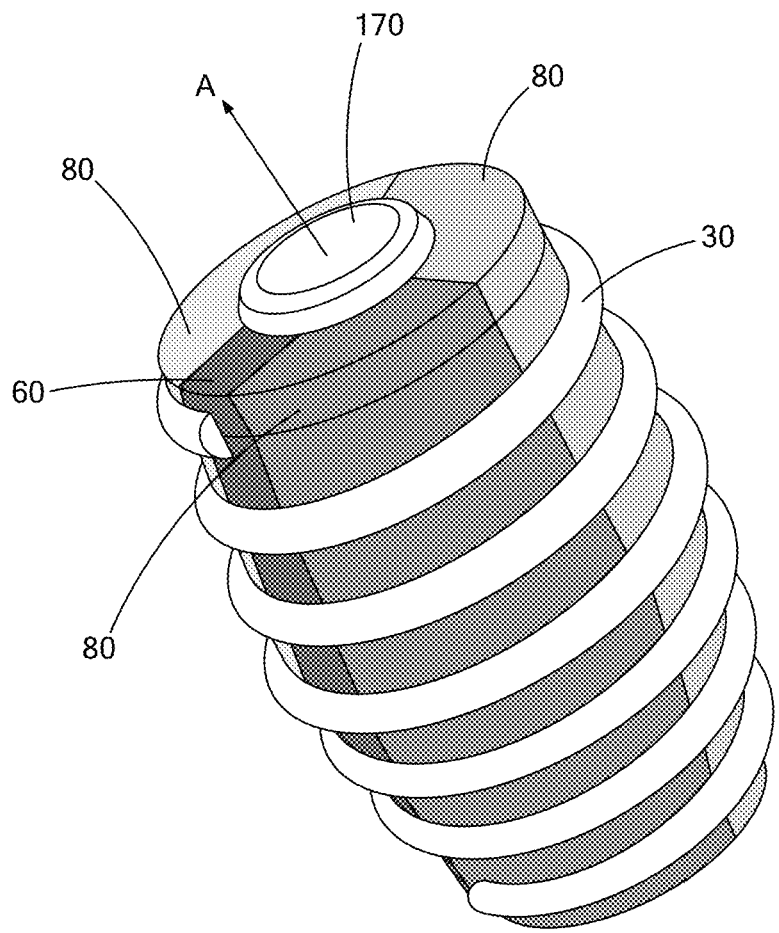
FIG. 12 is a perspective view of another inner mandrel and variable taper component constructed according to the teachings of the present disclosure.
Figure 13:
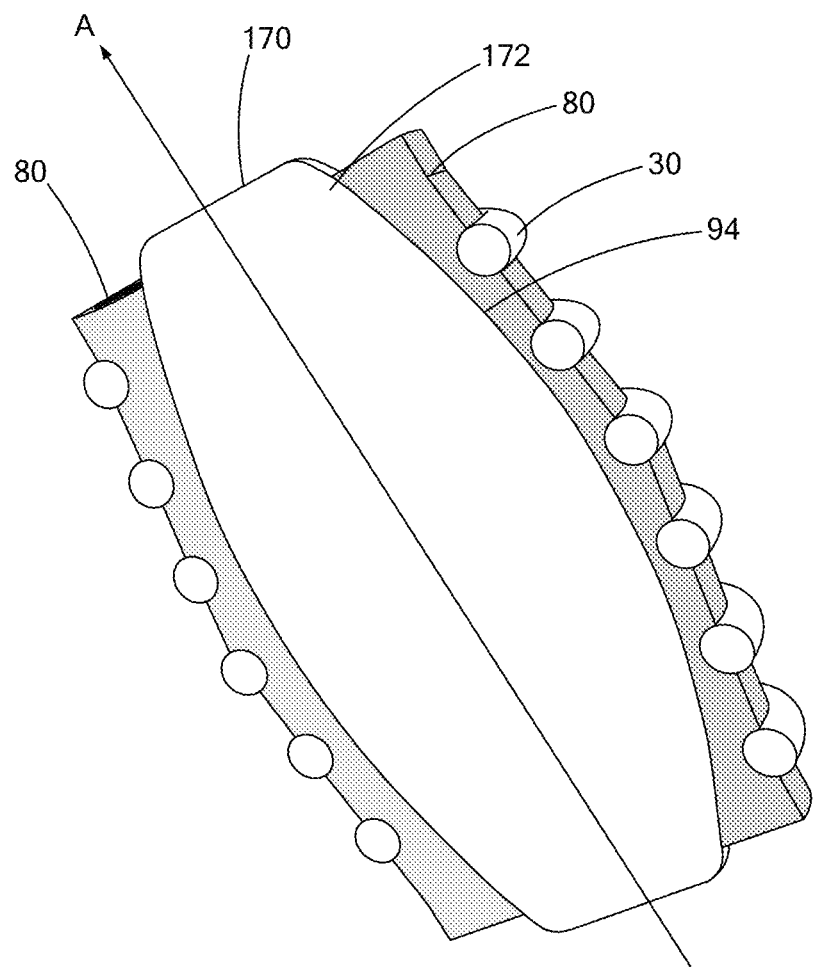
FIG. 13 is a cross-sectional view of the inner mandrel and variable taper component of FIG. 12.

With reference to FIGS. 12-13, the brace is an inflatable bladder 170 that secures the plurality of interlocking pieces 80 and the master insert 60 to each other in a concentric arrangement about the central axis A. The inflatable bladder 170 applies radially outward pressure to the interlocking pieces 80 and the master insert 60. The inflatable bladder 170 is a flexible, heat-resistant material that conforms to the tapered inner surfaces 94 of the interlocking pieces 80 and the master insert 60 and withstands conventional curing temperatures for the variable taper component 30. The inflatable bladder 170 is inserted into the cavity formed by the master insert 60 and the interlocking pieces 80 in an uninflated position (i.e., uninflated condition). Then, the inflatable bladder 170 is inflated to an inflated position (i.e., inflated condition) such that an outer surface 172 engages the tapered inner surfaces 94 to hold the interlocking pieces 80 and master insert 60 together while the variable tapered component 30 is formed, as shown in FIG. 13. Upon completion of the variable tapered component 30, the inflatable bladder 170 is deflated to allow the interlocking pieces 80 and master insert 60 to be disassembled from each other to allow removal of the variable tapered component 30.

In one form, the inflatable bladder 170 and/or the rotator 152 (FIG. 11) can be configured such that the inflatable bladder 170 may be mounted to the rods 160 (FIG. 11) for forming the variable tapered component 30 as described above. In one form, not specifically shown, the axial ends of the inflatable bladder 170 may define indents similar to the keyholes 164 (FIG. 11), though other configurations can be used.

Figure 14:
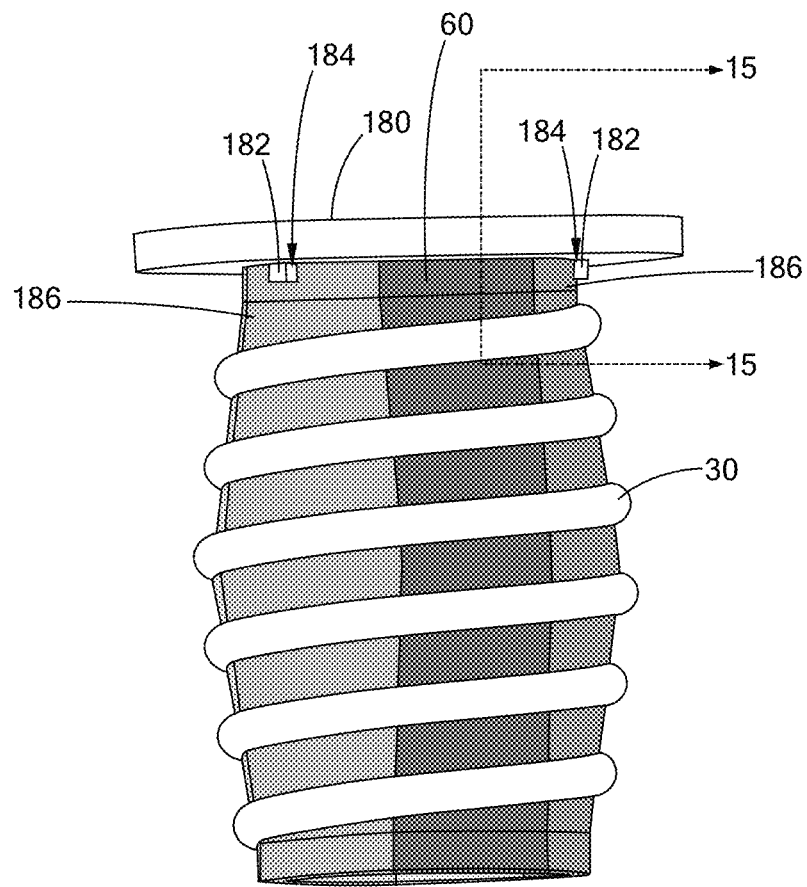
FIG. 14 is a perspective view of another inner mandrel and variable taper component constructed according to the teachings of the present disclosure.
Figure 15:
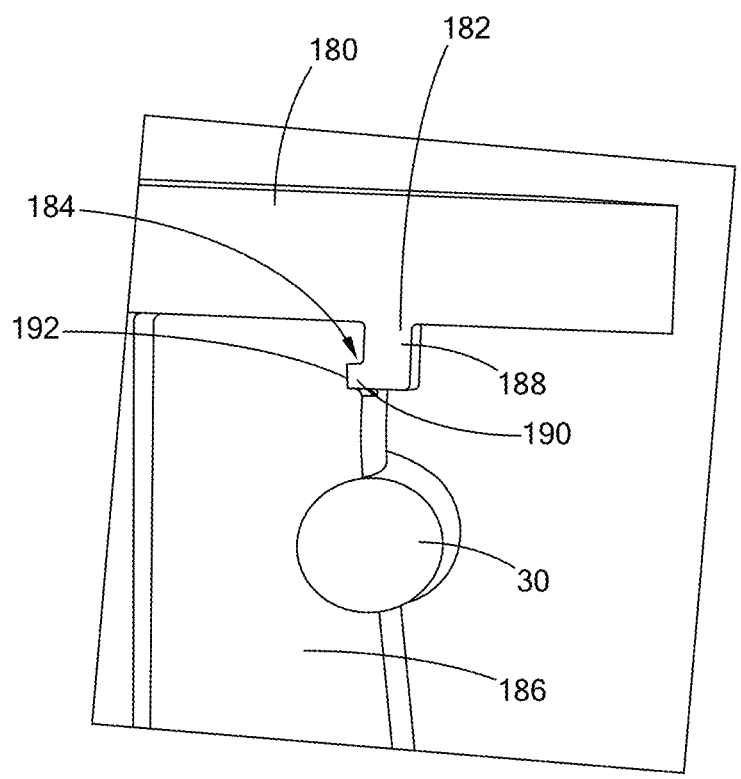
FIG. 15 is a cross-sectional view of the inner mandrel of FIG. 14 along the line 15-15.

With reference to FIGS. 14-15, in another form, the brace is a plate 180 including a plurality of extensions 182 secured to respective slots 184 defined in respective outer portions of the interlocking pieces 186. In the example provided, the interlocking pieces 186 are similar to the interlocking pieces 80 described above except for including the slots 184. The extensions 182 are resilient tabs that engage the slots 184 to apply radially inward pressure to the interlocking pieces 186. That is, the extensions 182 include a leg 188 and a tab 190 facing inward toward the slot 184, and the tab 190 engages a surface 192 in the slot when the plate 180 is pushed down onto the interlocking pieces 186, causing tension between the leg 188 and the slot 184 that secures the plate 180 to the interlocking piece 186. When the plate 180 is pulled up from the interlocking pieces 186, the leg 188 flexes and the tab 190 is pulled away from the surface 192, disconnecting the extension 182 from the interlocking piece 186. Upon removal of the plate 180, the interlocking pieces 186 and the master insert 60 may be removed from the variable taper component 30 as shown in FIGS. 7A-7L and described above. In the form shown, the extensions 182 are L-shaped and configured to fit into rectangular slots 184. It is within the scope of the disclosure for the extensions 182 and slots 184 to have different complementary shapes that secure the plate 180 to the interlocking pieces 186, such as the T-shapes of the locking features 132 shown in FIG. 4C. In another form, not specifically shown, the master insert 60 may include a slot 184, additionally or in place of one of the interlocking pieces 186 having a slot 184.

In one form, the plate 180 and/or the rotator 152 (FIG. 11) can be configured such that the plate 180 may be mounted to at least one of the rods 160 (FIG. 11) for forming the variable tapered component 30 as described above.

Figure 16:
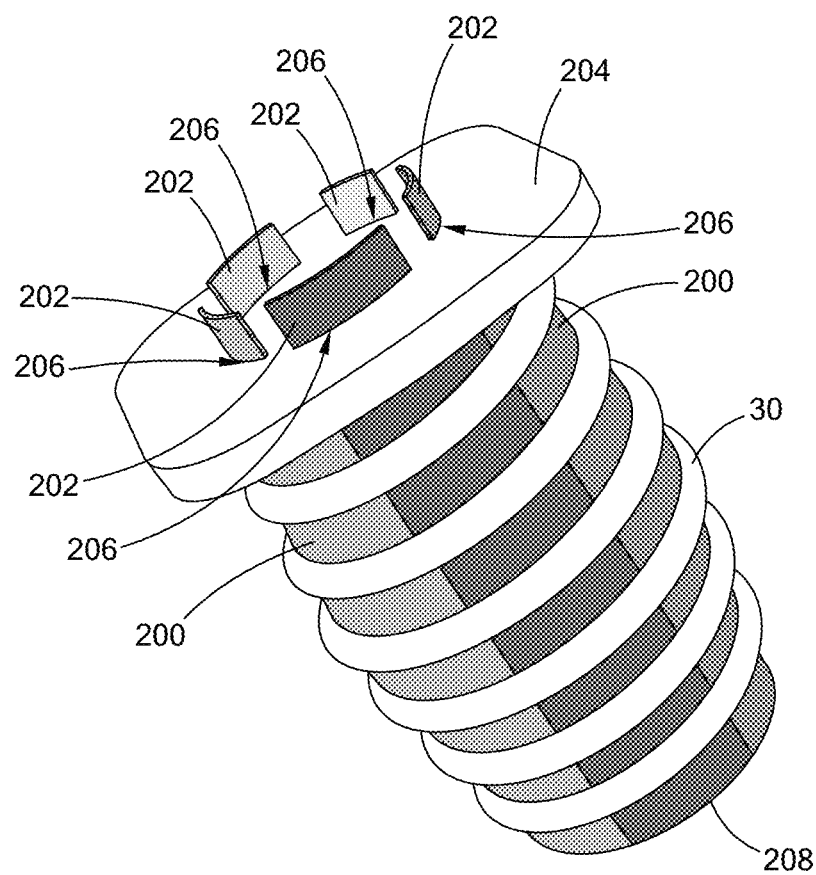
FIG. 16 is a perspective view of another inner mandrel and variable taper component constructed according to the teachings of the present disclosure.

Now referring to FIG. 16, in another form, each interlocking piece 200 and the master insert 208 includes a respective protrusion 202 extending form one axial end and the brace is a plate 204 defining a plurality of slots 206 that are configured to receive the protrusions 202. The plate 204 is placed onto the interlocking pieces 200 such that the protrusions 202 slide through the slots 206. The plate 204 is supported on an upper surface defined by the interlocking pieces 200 and the master insert 208 when the protrusions 202 are entirely through the slots 206. The plate 204 thus inhibits movement of the protrusions 202, and thereby braces the interlocking pieces 200 and master insert 208 to each other during formation of the variable taper component 30.

In one form, the plate 204 and/or the rotator 152 (FIG. 11) can be configured such that the plate 204 may be mounted to at least one of the rods 160 (FIG. 11) for forming the variable tapered component 30 as described above.

The protrusions 202 in the form shown in FIG. 16 have arcuate shapes, and the corresponding slots 206 have mating arcuate shapes. It is within the scope of this disclosure that the protrusions 202 and mating slots 206 have different shapes, such as lines, chevrons, polygons, or combinations thereof. In one form, each protrusion 202 has a different size or shape than each other protrusion 202, and each slot 206 is configured to receive exactly one of the protrusions 202. In such a form, the plate 204 and the interlocking pieces 200 and master insert 208 are configured to be arranged in only a specified orientation when each protrusion 202 extends through its specified slot 206. In another form, two or more of the slots 206 have a same size and shape to receive different protrusions 202, and the plate 204 can thus be applied in more than one orientation on the interlocking pieces 200. The orientation of the plate 204 and the interlocking pieces 200 and master insert 208 can be determined based on the position of the plate 204 relative to other components to improve manufacture of the variable taper component 30.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. Tooling for use in forming a variable taper component, the tooling comprising:
   an inner mandrel comprising:
      a plurality of interlocking pieces, each interlocking piece defining:
         opposed tapered edge faces, one of the opposed tapered edge faces defining at least one locking feature and another of the opposed tapered edge faces defining at least one receiving feature to engage the at least one locking feature of an adjacent interlocking piece;
         a first surface defining a variable taper and a plurality of recesses configured to receive at least a portion of the variable taper component; and
         a tapered second surface opposite the first surface; and
      a brace securing the plurality of interlocking pieces to each other in a concentric arrangement about a central axis; and
   an outer mandrel disposed around the inner mandrel, the outer mandrel defining a corresponding plurality of recesses configured to receive at least a portion of the variable taper component,
   wherein a maximum width of each of the interlocking pieces is smaller than a minimum width of end portions of the variable taper component, and a central portion of the variable taper component is wider than the end portions.

2. The tooling according to claim 1, wherein the locking feature is a linear tab and the receiving feature is a linear slot.

3. The tooling according to claim 1, wherein the locking feature is a T-shaped tab and the receiving feature is a T-shaped slot.

4. The tooling according to claim 1, wherein the locking feature and the receiving feature are magnetic.

5. The tooling according to claim 1, wherein the variable taper is continuously variable along end portions of the tooling and is constant along a central portion of the tooling.

6. The tooling according to claim 1, wherein the plurality of interlocking pieces and the outer mandrel define a variable taper helix.

7. The tooling according to claim 1, wherein the brace is one of an inflatable bladder and a plate.

8. The tooling according to claim 7, wherein the plate includes a plurality of extensions secured to respective slots defined in respective outer portions of the interlocking pieces.

9. The tooling according to claim 7, wherein each interlocking piece includes a respective protrusion and the plate defines a respective slot configured to receive at least one of the protrusions.

10. The tooling according to claim 9, wherein each protrusion has a different size or shape than each other protrusion, and each slot is configured to receive exactly one of the protrusions.

11. The tooling according to claim 7, wherein the inflatable bladder has an outer surface engaging respective inner surfaces of the interlocking pieces.

12. The tooling according to claim 1, wherein the brace is an insert engaging respective inner surfaces of the interlocking pieces, the insert defining respective key holes on opposing ends, the key holes configured to receive respective end plug keys of a rotator.

13. An inner mandrel for forming a variable taper component, the inner mandrel comprising:
   a plurality of interlocking pieces, each interlocking piece defining:
      opposed tapered edge faces, one of the opposed tapered edge faces defining at least one locking feature and another of the opposed tapered edge faces defining at least one receiving feature to engage the at least one locking feature of an adjacent interlocking piece;
      a first surface defining a variable taper and a plurality of recesses configured to receive at least a portion of the variable taper component; and
      a tapered second surface opposite the first surface, and
   a brace securing the plurality of interlocking pieces to each other in a concentric arrangement about a central axis,
   wherein a maximum width of each of the interlocking pieces is smaller than a minimum width of an end portion of the variable taper component, and a central portion of the variable taper component is wider than the end portions.

14. The inner mandrel according to claim 13, wherein the brace is an inflatable bladder having an outer surface engaging respective inner surfaces of the interlocking pieces.

15. The inner mandrel according to claim 13, wherein the brace is a plate configured to secure the interlocking pieces to each other.

16. The inner mandrel according to claim 15, wherein the plate includes a plurality of extensions secured to respective slots defined in respective outer portions of the interlocking pieces.

17. The inner mandrel according to claim 15, wherein each interlocking piece includes a respective protrusion and the plate defines a respective slot configured to receive one of the protrusions of the interlocking pieces.

18. The inner mandrel according to claim 13, wherein the brace is an insert engaging respective inner surfaces of the interlocking pieces, the insert defining respective key holes on opposing ends, the key holes configured to receive respective end plug keys of a rotator.

19. A method of forming a variable taper component comprising:
  placing a variable taper component preform around the inner mandrel according to claim 13; and
  forming a variable taper component from the variable taper component preform.

20. A composite coil spring formed according to the method of claim 19.

\* \* \* \* \*